United States Patent
Ross et al.

(10) Patent No.: US 10,489,861 B1
(45) Date of Patent: Nov. 26, 2019

(54) METHODS AND SYSTEMS FOR IMPROVING THE UNDERWRITING PROCESS

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 464 days.

(21) Appl. No.: 14/581,151

(22) Filed: Dec. 23, 2014

Related U.S. Application Data (60) Provisional application No. 61/920,098, filed on Dec. 23, 2013.

(51) Int. Cl.
*G06Q 40/08* (2012.01)

(52) U.S. Cl.
CPC .................... *G06Q 40/08* (2013.01)

(58) Field of Classification Search
CPC ..................................... G06Q 40/08
See application file for complete search history.

(56) References Cited

U.S. PATENT DOCUMENTS

| | | |
|---|---|---|
| 5,067,099 A | 11/1991 | McCown et al. |
| 5,270,425 A | 12/1993 | Vanwert et al. |
| 5,331,579 A | 7/1994 | Maguire, Jr. et al. |

(Continued)

FOREIGN PATENT DOCUMENTS

| | | | | |
|---|---|---|---|---|
| CA | 2441810 A1 | * | 9/2001 | ............. G06Q 40/08 |
| CA | 2441810 A1 | * | 9/2001 | ............. G06Q 40/08 |

OTHER PUBLICATIONS

Romanycia, et al., What is a heuristic?, 2012 entire document pertinent, retrieved from https://web.archive.org/web/20120127125955/http://www.sfu.ca/~jeffpell/papers/RomanyciaPelletierHeuristics85.pdf (Year: 2012).*

(Continued)

*Primary Examiner* — Bennett M Sigmond
*Assistant Examiner* — Gregory S Cunningham, II
(74) *Attorney, Agent, or Firm* — Eric L. Sophir; Dentons US LLP (57) ABSTRACT

The embodiments recite systems and methods that improve the traditional underwriting process within a financial institution. These embodiments produce an underwriting model that emulates the resolution patterns of top performing underwriters. The underwriting model once is built and tested is incorporated into decision tools that provide underwriters with insightful advices when underwriting a client. The embodiments use statistical learning techniques such as support vector machine and logistic regression. These techniques can assume a linear or nonlinear relationship between factors and risk classes. Furthermore, the underwriting model also uses artificial intelligence tools such as expert systems and fuzzy logic. A company's underwriting standards and best underwriting practices may be updated periodically so that underwriting model based on decision heuristic keep improving the quality of its output over time.

14 Claims, 5 Drawing Sheets

(56) References Cited

U.S. PATENT DOCUMENTS

| | | | |
|---|---|---|---|
| 5,523,942 A | 6/1996 | Tyler et al. | |
| 5,724,262 A | 3/1998 | Ghahramani | |
| 5,787,235 A | 7/1998 | Smith et al. | |
| 5,809,478 A | 9/1998 | Greco et al. | |
| 5,970,464 A | 10/1999 | Apte et al. | |
| 6,154,725 A | 11/2000 | Donner | |
| 6,456,979 B1 | 9/2002 | Flagg | |
| 6,542,905 B1 | 4/2003 | Fogel et al. | |
| 6,549,815 B1 | 4/2003 | Kaji | |
| 7,006,992 B1 | 2/2006 | Packwood | |
| 7,072,841 B1 | 7/2006 | Pednault | |
| 7,287,008 B1 | 10/2007 | Mahoney et al. | |
| 7,831,451 B1 | 11/2010 | Morse et al. | |
| 7,895,062 B2 | 2/2011 | Bonissone et al. | |
| 7,899,688 B2 | 3/2011 | Bonissone et al. | |
| 8,515,783 B1 | 8/2013 | Weeks | |
| 8,793,146 B2 | 7/2014 | Bonissone et al. | |
| 8,838,498 B2 | 9/2014 | Ross | |
| 2001/0027519 A1 | 10/2001 | Gudbjartsson et al. | |
| 2002/0029158 A1 | 3/2002 | Wolff et al. | |
| 2002/0116309 A1 | 8/2002 | Keyes et al. | |
| 2002/0138310 A1 | 9/2002 | Sagalow | |
| 2003/0088493 A1 | 5/2003 | Larsen et al. | |
| 2003/0182159 A1 | 9/2003 | Bonissone et al. | |
| 2003/0187700 A1 | 10/2003 | Bonissone et al. | |
| 2003/0187768 A1 | 10/2003 | Ryan et al. | |
| 2003/0212667 A1 | 11/2003 | Andersch et al. | |
| 2003/0225605 A1 | 12/2003 | Yokota et al. | |
| 2004/0039610 A1 | 2/2004 | Weitermann et al. | |
| 2004/0128262 A1 | 7/2004 | Nafousi | |
| 2004/0133439 A1 | 7/2004 | Noetzold et al. | |
| 2004/0220840 A1 | 11/2004 | Bonissone et al. | |
| 2005/0055296 A1 | 3/2005 | Hattersley et al. | |
| 2005/0065754 A1 | 3/2005 | Schaf et al. | |
| 2005/0108062 A1 | 5/2005 | Higgins | |
| 2005/0246260 A1 | 11/2005 | Hodgdon et al. | |
| 2005/0273370 A1 | 12/2005 | Udell et al. | |
| 2005/0278198 A1 | 12/2005 | Huxol et al. | |
| 2006/0100912 A1 | 5/2006 | Kumar et al. | |
| 2006/0112111 A1 | 5/2006 | Tseng et al. | |
| 2006/0155699 A1 | 7/2006 | Purvis et al. | |
| 2006/0247956 A1 | 11/2006 | Rosen et al. | |
| 2006/0270918 A1 | 11/2006 | Stupp et al. | |
| 2007/0005401 A1 | 1/2007 | Vinyard | |
| 2007/0016542 A1* | 1/2007 | Rosauer | G06N 5/022 706/21 |
| 2007/0027725 A1 | 2/2007 | Dirnberger et al. | |
| 2009/0070188 A1 | 3/2009 | Scott et al. | |
| 2009/0299911 A1 | 12/2009 | Abrahams et al. | |
| 2010/0017234 A1 | 1/2010 | Stephens et al. | |
| 2010/0114741 A1 | 5/2010 | Adama et al. | |
| 2010/0185534 A1 | 7/2010 | Satyavolu et al. | |
| 2011/0010367 A1 | 1/2011 | Jockish et al. | |
| 2011/0040582 A1 | 2/2011 | Mullins | |
| 2011/0066454 A1 | 3/2011 | Rosauer et al. | |
| 2011/0246268 A1 | 10/2011 | Satyavolu et al. | |
| 2011/0246280 A1 | 10/2011 | Satyavolu et al. | |
| 2011/0246292 A1 | 10/2011 | Satyavolu et al. | |
| 2011/0246346 A1 | 10/2011 | Satyavolu et al. | |
| 2012/0004968 A1 | 1/2012 | Satyavolu et al. | |
| 2012/0078913 A1 | 3/2012 | Muni et al. | |
| 2012/0221485 A1 | 8/2012 | Leidner et al. | |
| 2012/0296676 A1 | 11/2012 | Burgoon, Jr. et al. | |
| 2013/0060582 A1 | 3/2013 | Cutino et al. | |
| 2013/0332204 A1 | 12/2013 | Fiori et al. | |
| 2014/0108277 A1* | 4/2014 | Dresner | G06Q 30/018 705/317 |
| 2014/0195412 A1 | 7/2014 | Metz et al. | |
| 2014/0379386 A1 | 12/2014 | Drennan, III | |
| 2015/0081319 A1 | 3/2015 | Kemp et al. | |
| 2015/0205825 A1* | 7/2015 | Sengupta | G06F 17/30312 707/758 |
| 2016/0110442 A1 | 4/2016 | Williams et al. | |

OTHER PUBLICATIONS

Stobie, et al., Artificial Intelligence at Coutrywide, entire document pertinent, Publisher IEEE, 1996, retrieved from https://ieeexplore.ieee.org/document/554546/authors#authors (Year: 1996).*

HedBerg, Is AI going mainstream at last? a look inside Microsoft research, entire document pertinent, Published in IEEE Intelligent Systems and their Applications (vol. 13, Issue: 2, pp. 21-25), Mar. 1, 1998 (Year: 1998).*

Collins et al., "An Application of a Multiple Neural Network Learning System to Emulation of Mortgage Underwriting Judgements," Proceedings of the IEEE International Conference on Neural Networks, 1988, pp. 11-459 through 11-466.

K. Aggour et al., "Automating the Underwriting of Insurance Applications," AI Magazine, 27, Fall 2006, pp. 36-50.

P. Bonissone et al., "Evolutionary Optimization of Fuzzy Decision Systems for Automated Insurance Underwriting," Proc. Fuzz-IEEE 2002, Honolulu, HI, May 2002, pp. 1003-1008.

W. Yan et al., "Designing a Neural Network Decision System for Automated Insurance Underwriting," 2006 International Joint Conference on Neural Networks, Jul. 2006, pp. 2106-2113.

* cited by examiner

METHODS AND SYSTEMS FOR IMPROVING THE UNDERWRITING PROCESS

CROSS-REFERENCE TO RELATED APPLICATIONS

This application claims priority to U.S. Provisional Patent Application Ser. No. 61/920,098, filed Dec. 23, 2013, which is hereby incorporated by reference in its entirety.

This application relates to U.S. Provisional Application No. 61/920,104, entitled "Heuristic Model For Improving The Underwriting Process," filed on Dec. 23, 2013, and U.S. Provisional Application No. 61/920,110, entitled "Method For Validating Heuristics Outcome In The Underwriting Process," filed on Dec. 23, 2013, which are hereby incorporated by reference in their entirety.

FIELD OF THE DISCLOSURE

The present disclosure relates generally to underwriting processes, and more specifically to a method for improving underwriting processes based on a heuristics approach.

BACKGROUND

Underwriting is the process that financial service providers use to determine eligibility of their costumers to receive their products (equity capital, insurance, mortgage or credit). Currently, the underwriting process may be described almost entirely as a manual process. Trained individuals, or underwriters, traditionally perform the underwriting process. The underwriting process may be very time-consuming and may involve the analysis of a plurality of underwriting standards set by a financial institution. Furthermore, the underwriting process may be biased by the judgment of the underwriter. Variation in factors such as underwriter training, experience, and quality of previous assessments may cause underwriters to make different decisions and judgments. As a result, there can be a large amount of variability and inconsistencies in the insurance underwriting process. Therefore, there is a need to improve conventional underwriting methods.

SUMMARY

A system and method for improving the underwriting process are disclosed. According to an embodiment, the underwriting system operates within a system architecture that includes components that dynamically interact with each other through network connections. In this embodiment, the system includes one or more client computing devices, one or more external sources, one or more internal databases, an underwriting platform, and one or more of the following software modules: analytical engine, ranking module, underwriting heuristics, and decision tools. Further to this embodiment, the system includes a user interface to interact with users (agents/underwriters) by means of a client computing device.

According to some embodiments, a method for improving the underwriting process within an insurance company includes a plurality of steps performed by a processor. The steps include: retrieving outcome data to select and determine best underwriters; reviewing associated data that is associated with the best underwriters to understand decision and triage process; determining significance of key data elements; building a heuristic underwriting model; testing the model; and deploying decision tool within an underwriting platform.

By executing this method through the exemplary operating environments, big data analytics and data mining techniques can be implement for a more efficient and faster processing of larger data sets. In this way, efficiencies are created by providing the financial or insurance company with ways to improve the current underwriting process. In addition, the agents/underwriters can receive automatic suggestions or checklists with valuable information before making important decisions when underwriting an applicant for one or more insurance products. These features allow performing large work such as heavy calculations and time consuming analysis in a more efficient manner than other approaches such as manual work performed by humans.

In one embodiment, a computer-implemented method comprises determining, by a server, a subset of underwriter profiles from a set of former and current underwriter profiles based upon performance of the underwriters associated with the subset of underwriter profiles for a set of historic data obtained from an internal database; identifying, by the server, variables that are statistically similar for underwritten records associated with the subset of underwriter profiles, wherein the variables represent decision heuristics of the underwriters associated with the subset of underwriter profiles; generating, by the server, a heuristic underwriting computer model that generates a resolution based upon the identified variables that are statistically similar for underwritten records associated with the subset of underwriter profiles; and generating, by the server, a decision tool based on the heuristic underwriting computer model for an underwriting platform.

In another embodiment, a system comprises an analytical engine server comprising a first module configured for determining, by the analytical engine server, a subset of underwriter profiles from a set of former and current underwriter profiles based upon performance of the underwriters associated with the subset of underwriter profiles for a set of historic data obtained from an internal database; a second module configured for identifying, by the analytical engine server, variables that are statistically similar for underwritten records associated with the subset of underwriter profiles, wherein the variables represent decision heuristics of the underwriters associated with the subset of underwriter profiles; a third module configured for generating, by the analytical engine server, a heuristic underwriting computer model that generates a resolution based upon the identified variables that are statistically similar for underwritten records associated with the subset of underwriter profiles; and a fourth module configured for generating, by the analytical engine server, a decision tool based on the heuristic underwriting computer model for an underwriting platform.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Premium" refers to a periodic payment that a customer offers to a financial institution.

"Underwriting platform" refers to a software where data is sorted, processed and analyzed by a set of application tools to provide insightful advices to the user.

"Underwriting process" refers to the assessment of a risk associated with a potential customer. It defines the risk that a financial institution may accept in exchange for the payment of a premium.

"Underwriting model" refers to an algorithm which measures the risk of a potential customer. Underwriting decision heuristic can set a premium based on company's standards and best underwriting practices gathered from top performing underwriters.

"Factor" refers to information which can be used as a reference for measuring the risk associated with a potential customer. A factor may be information such as age, current health, and occupation, among others.

"Risk score" refers to a measure which describes the risk associated with a factor.

"Risk of loss" refers to a measure which describes the risk associated with a potential customer based on the analysis of a set of factors.

"Risk category" refers to a class which describes a level of risk. A premium may be associated with a risk category.

"Risk classification" refers to a method which classify a potential customer into a risk category.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Figure 1:
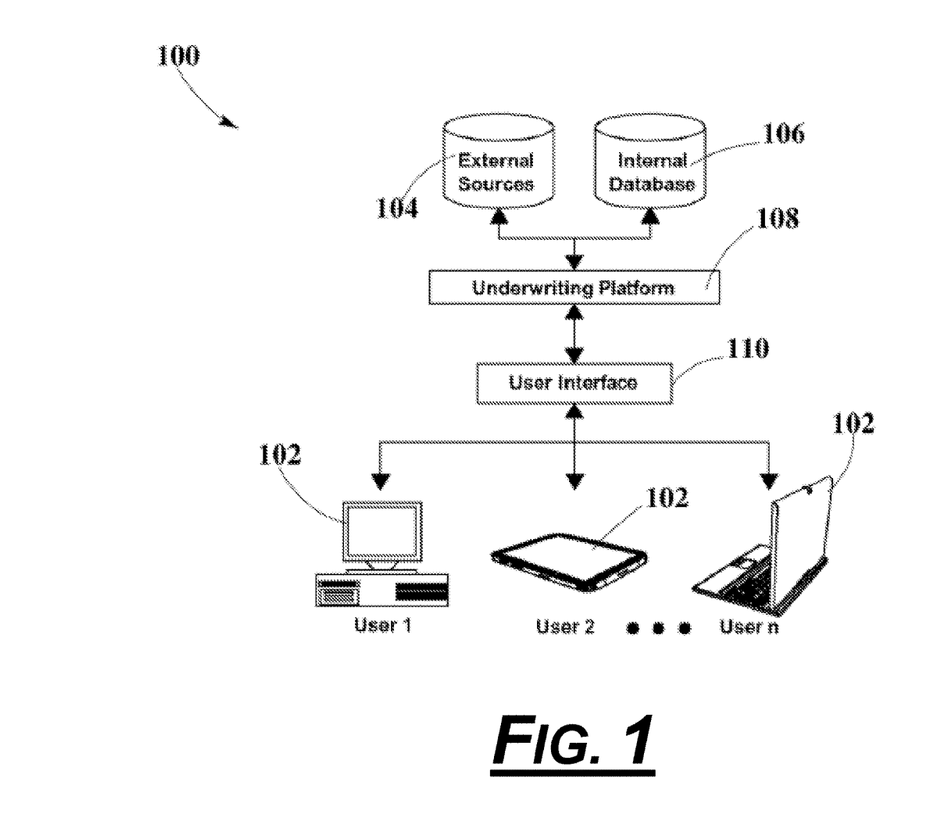
FIG. 1 is a block diagram illustrating a system for improving the underwriting process, according to an exemplary embodiment.

FIG. 1 is an exemplary system for improving the underwriting process in the financial service industry. In some embodiments, system 100 is owned by an insurance company.

In FIG. 1, system 100 includes one or more client computing devices 102, one or more external sources 104, one or more internal databases 106, underwriting platform 108, and user interface 110. Underwriting platform 108 further includes one or more software modules, such as, one or more analytical engines, one or more ranking modules, one or more underwriting heuristics modules, and one or more decision tools. The modules and tools contained/operating within underwriting platform 108 are further described in FIG. 3, below.

In FIG. 1, underwriting platform 108 is operatively coupled to and in bi-directional communication with one or more user interfaces 110, one or more external sources 104, and one or more internal databases 106. Client computing devices 102 are operatively coupled to and in bi-directional communication with one or more user interfaces 110. Each module within underwriting platform 108 may be a set of computer instructions executed by central processing units that run computer executable program instructions or related algorithms. Each central processing unit may be a component of computing devices such as a server, a single computer, or multiple computers in a distributed configuration.

Each of the different components of system 100 may be implemented to run on any type of processor-controlled device that receives, processes, and/or transmits digital data, configured as further described below. In an example, a processing unit may include a processor with computer-readable medium, such as a random access memory (RAM) (not shown) coupled to the processor. Examples of processor may include a microprocessor, application specific integrated circuit (ASIC), and field programmable object array (FPOA), among others. Examples of devices incorporating one or more processor-controlled devices include smartphones, desktop computers, laptop computers, servers, tablets, PDAs, specialized computing platforms for processing, ranking, and triaging lead quality, and the like.

Examples of client computing devices 102, include smartphones, desktop computers, laptop computers, servers, tablets, PDAs, and/or another type of processor-controlled device that receives, processes, and/or transmits digital data.

In FIG. 1, underwriting platform 108 is a platform that may run on one or more servers. In some embodiments, underwriting platform 108 runs one or more software modules that are configured to gather, process, interpret, and identify profiles of former or current underwriters. In these embodiments, underwriting platform 108 produces an underwriting model that may be embedded within a set of decision tools. In some embodiments, decision tools are tools that provide guidance to one or more agents/underwriters when underwriting one or more applicants. In these embodiments, underwriting platform 108 includes software code for running related algorithms or computer executable program instructions.

In FIG. 1, external sources 104 collects, stores and provides outcome data to internal database 106 and underwriting platform 108. In some embodiments, external sources 104 collect the outcome data from the internet, social network, credit bureaus, police records, hospitals, Geocentric Mortality Data Centers, and the like. Examples of outcome data include credit history, drug history, medical history, and police records, demographic information, social and recreational habits and associated risks, among others.

In FIG. 1, internal database 106 is a relational database that provides the functions of fetching, indexing, and storing internal data. In one embodiment, internal database 106 receives and stores outcome data and provides said outcome data to underwriting platform 108. Examples of internal data include insurance type requested, insurance amount requested, electronic copy of the insurance application, and note from interviews with insurance company representatives, underwriter profiles, among others. Examples of underwriter profiles include profiles of currently working underwriters as well as former underwriters within a financial institution such as, for example, an Insurance Company. External sources 104 and internal database 106 may be implemented through database management systems (DBMS), such as, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

In exemplary operation, underwriting platform 108 within system 100 retrieves internal data from internal database 106, outcome data from external database 104, and processes the received internal and outcome data to determine and otherwise select the best underwriters. Underwriting platform 108, through the aid of the analytical engine and the ranking module, reviews and determines the significance of key data elements so as to build a heuristic underwriting model based on the behavior of best underwriters. In some embodiments, the key data elements are developed by tracking the behavior of best underwriters to specific underwriting situations involving internal data and outcome data. Additional examples of key data elements include certificates of studies, recommendations, number of cases worked, and goals achieved among others.

The heuristic underwriting model is tested and then deployed within the decision tools. The decision tools provide the user, via user interface 110, with a guide or a checklist at relevant points during the underwriting process. An authorized user may interact with user interface 110 via an input device, such as, for example a touch screen, a mouse, a keyboard, a keypad, and the like as part of client computing devices 102.

Figure 2:
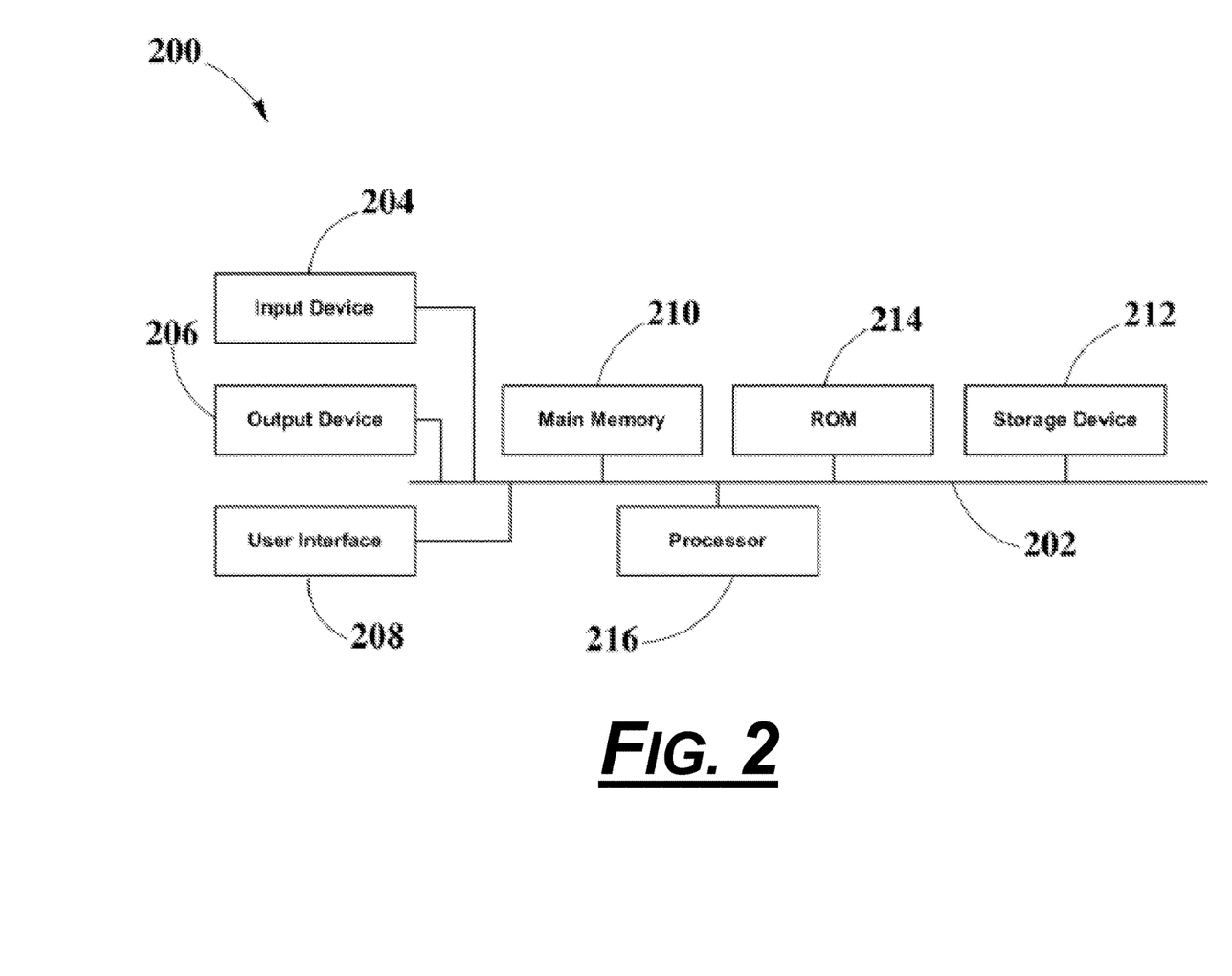
FIG. 2 is a block diagram illustrating an exemplary computing device in which one or more embodiments of the present disclosure may operate, according to an embodiment.

FIG. 2 is a diagram of example components of computing device 200 or server, according to an exemplary embodiment. In FIG. 2, computing device 200 includes example components of computing devices, such as, servers, laptop computers, desktop computers, tablets, smartphones, and the like that may operate within system 100 of FIG. 1, execute modules described in FIG. 3, or execute code implementing concepts/ideas contained in FIGS. 4 & 5, according to an exemplary embodiment.

According to some aspects of this embodiment, computing device 200 includes bus 202, input device 204, output device 206, user interface 208, main memory 210, storage device 212, read only memory (ROM 214) and processor 216. In another exemplary embodiment, server includes additional, fewer, different, or differently arranged components than are illustrated in FIG. 2.

In one embodiment, bus 202 coordinates the interaction and communication among the components of the server. Input device 204 includes a mechanism that permits a user to input information to computing device 200, such as a keyboard, a mouse, a button, a pen, a touch screen, voice recognition and/or biometric mechanisms, etc. Output device 206 includes a mechanism that outputs information to the operator, including a display, a light emitting diode (LED), and a speaker, among others.

User interface 208 enables computer interactions with other devices and/or systems via a network connection. Network connections may refer to any connection between computers such as intranets, local area networks (LAN), cloud networks, virtual private networks (VPN), wireless area networks (WAN), and the internet, among others.

Main memory 210 includes a random access memory (RAM) or another type of dynamic storage device that may store information and instructions for execution by processor 216. ROM 214 includes a ROM device or another type of static storage device that may store static information and instructions for use by processor 216. Processor 216 includes a microprocessor, an application specific integrated circuit (ASIC), and a field programmable object array (FPOA), among others, that may interpret and execute instructions.

According to some aspects of this embodiment, a server using one or more software modules enables data fetching and predictive analytics. The server performs these operations in response to processor 216 executing software instructions contained in a computer-readable medium, such as main memory 210.

The software instructions reads into main memory 210 from another computer-readable medium, such as storage device 212, or from another device via user interface 208. The software instructions contained in main memory 210 may cause processor 216 to perform processes that will be described later. Alternatively, hardwired circuitry may be used in place of or in combination with software instructions to implement processes described herein. Thus, implementations described herein are not limited to any specific combination of hardware circuitry and software.

Figure 3:
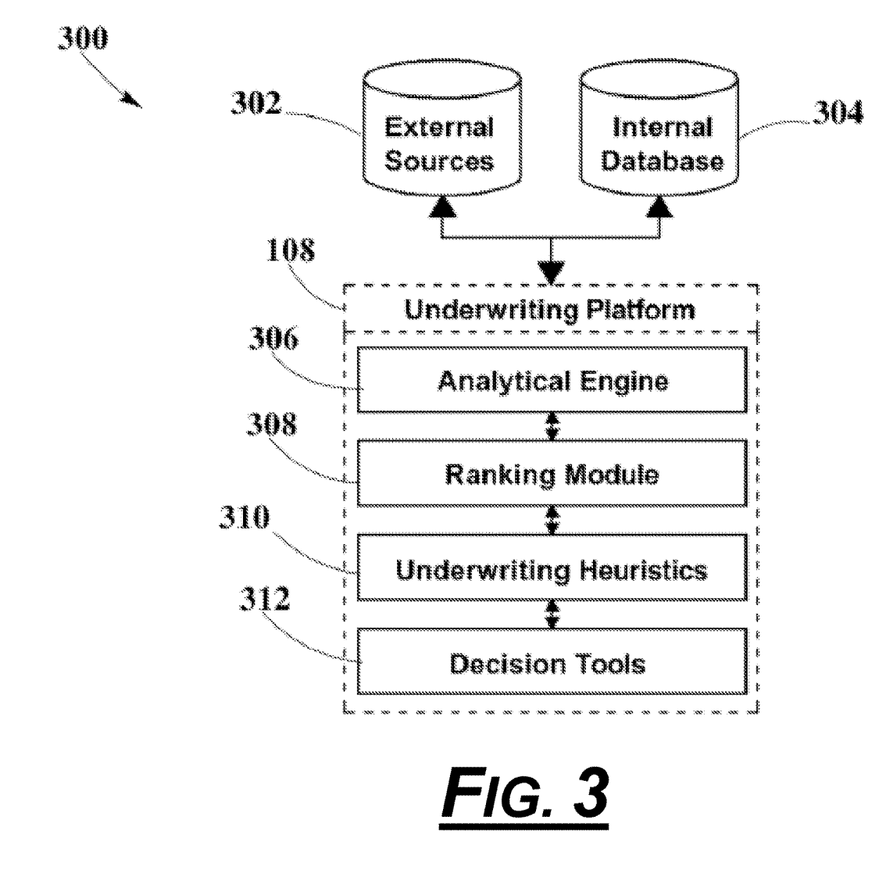
FIG. 3 is a block diagram illustrating a portion of a system pertaining to underwriting platform including one or more software modules.

FIG. 3 is a block diagram illustrating a portion of a system pertaining to underwriting platform 108. In FIG. 3, subsystem 300 includes external sources 302, internal database 304, and underwriting platform 108. Underwriting platform 108 further includes analytical engine 306, ranking module 308, underwriting heuristics module 310, and decision tools 312. In some embodiments, subsystem 300 of FIG. 3 can be implemented as one or more components of system 100 of FIG. 1. It should be understood that subsystem 300 can include less components, more components, or different components depending on the desired analysis goals.

In an example, analytical engine 306, ranking module 308, underwriting heuristics module 310, and decision tools 312, are implemented as analytical engine, ranking module, underwriting heuristics module, and decision tools in system 100 of FIG. 1. In FIG. 3, analytical engine 306, ranking module 308, underwriting heuristics module 310, and decision tools 312 are operatively coupled to and in communication with external sources 302 and internal database 304.

In one or more embodiments, externals sources 302 collects, stores and provides outcome data to internal database 304 and underwriting platform 108. In some embodiments, external sources 302 collect the outcome data from the internet, social network, credit bureaus, police records, hospitals, Geocentric Mortality Data Centers, and the like. Examples of outcome data include credit history, drug history, medical history, and police records, demographic information, social and recreational habits and associated risks, among others.

In other embodiments, internal database 304 is a relational database that provides the functions of fetching, indexing, and storing internal data. In one embodiment, internal database 304 receives and stores outcome data and provides said outcome data to underwriting platform 108. External sources 302 and internal database 304 may be implemented through database management systems (DBMS), such as, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

In one or more embodiments, analytical engine 306 is configured to process one or more tasks such as, for example, fetching and mining outcome and internal data from the internal database and external sources to determine the best underwriters. In this embodiment, the analytical engine identifies the underwriters that show the highest scores in their performance throughout a standard period of time. In an example, a high score is related to an underwriter having a minimal amount of claims, that are associated with his underwriting, negatively impacting the company.

In some embodiments, ranking module 308 works in parallel with the analytical engine to aid in the selection of the best underwriters. In one or more embodiments, ranking module 308 is configured to fetch the determined best underwriters from analytical engine 306 and rank them based on the score assigned to them by analytical engine 306.

In one or more embodiments, underwriting heuristics module 310 is configured to aid the analytical engine to identify key data elements of the previously ranked best underwriters by validating the statistical significance of the heuristic decisions made by the underwriters when underwriting insurance applicants. In an example, underwriting heuristics module 310 reviews previous underwritten applications that issued against actual claim experience to determine statistical significance of the heuristic decisions made by the underwriters. In this embodiment, underwriting heuristics module 310 is further configured to aid analytical engine 306 in building an underwriting model of the most relevant points, and subsequently testing said underwriting model and embedding it into decision tools 312. In some embodiments, underwriting heuristics module 310 provides the key data elements to analytical engine 306 to assist in building the underwriting model.

In one or more embodiments, decision tools 312 is configured to aid one or more underwriters during the underwriting process. In these embodiment, decision tools 312, through the user interface (not shown in FIG. 3), is triggered when junior underwriters underwriting one or applicants match one or more key elements data. In some embodiments, decision tools 312 provide guides and checklists for different scenarios when underwriting an applicant for an insurance product. Examples of checklists include a plurality of steps that the best underwriters take when underwriting an applicant in a specific insurance product and given specific situations.

Figure 4:
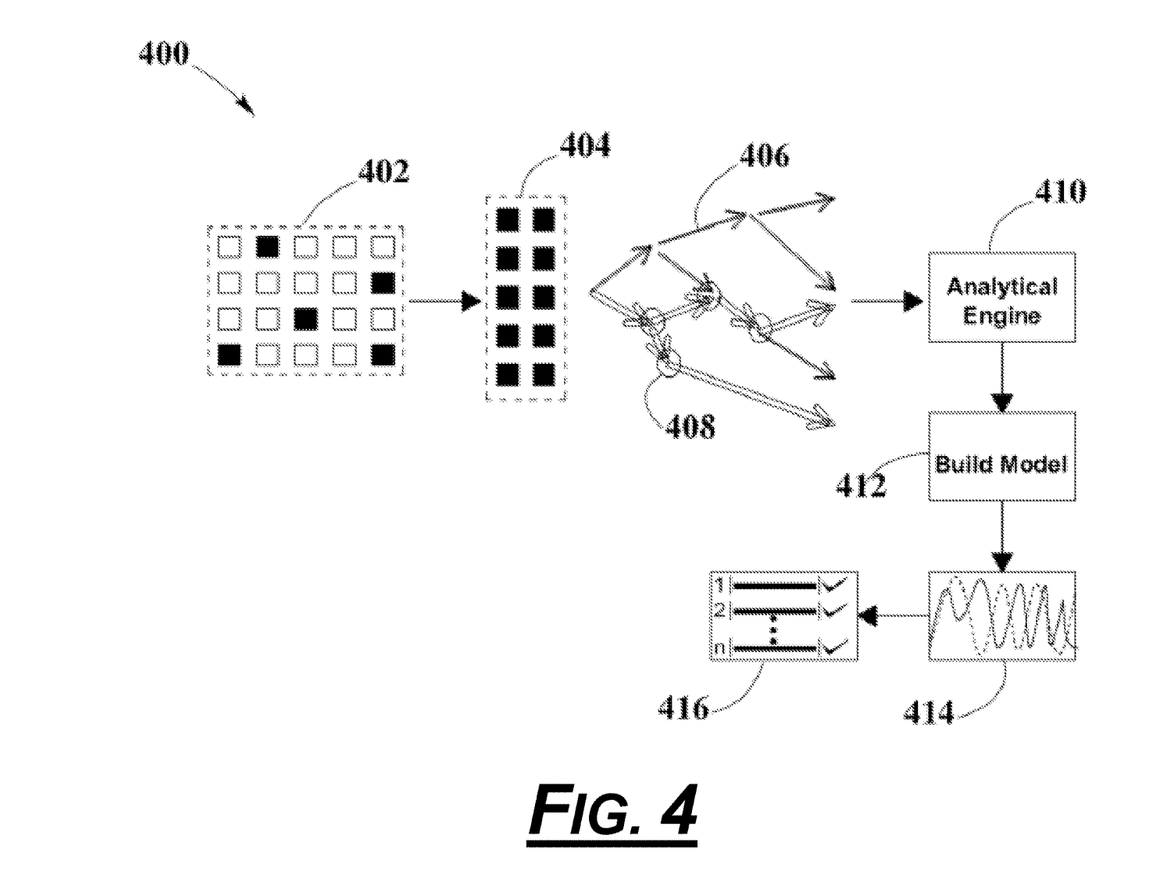
FIG. 4 illustrates a process for validating underwriting heuristics and incorporating decision heuristics into decision tools, according to an embodiment.

FIG. 4 shows a block diagram describing a process 400 for validating underwriting heuristics and incorporating decision heuristics into decision tools, according to an embodiment.

Process 400 begins with identifying 402 the best underwriters from a pool of underwriters or agents. In one embodiment, identifying 402 the best underwriters is achieved by mining outcome data from a database and selecting 404 top performers in the underwriting process based on a predefined ranking system.

In one embodiment, the predefined ranking system uses any ranking method based on a set of attributes from the underwriters to make the selection. In one or more embodiments, the attributes includes the ability to make decisions, certificates of studies, recommendations, number of cases worked, and goals achieved among others.

Following process 400, interview 406 with the best underwriters is performed. In some embodiments, the interview is performed either manually or by using the client computing device. Interview 406 may be oriented to understand the decision heuristics made by the underwriters. For example, the best underwriters may take different paths for solving a case and hence drawing a pattern when taking actions at different decision nodes 408 to complete an underwriting process. At each of the decision nodes 408, the underwriters use their judgment and experience to take an action based on the type of case.

Following the process, after validating statistical significance 410 of heuristic decision nodes 408, the information obtained is used to build an underwriting model 412 of most relevant points. In one or more embodiments, underwriting model 412 is coded by using any suitable programming language and may provide the agent or underwriter with a resolution based on the underwriting standards set by the company, potentially enhanced with third party data, and the best practices derived from the top performing underwriters within the company. In one embodiment, the resolution provided by underwriting model 412 is a risk score calculation, a risk of loss assessment, or a risk classification, among others. In another embodiment, underwriting model 412 emulates the resolution patterns of top performing underwriters by using artificial intelligence tools such as expert systems and fuzzy logic.

The company's underwriting standards and best underwriting practices may be updated periodically so that underwriting decision heuristic keep improving the quality of its output over time.

After building underwriting model 412, a test 414 for the model, such as Monte Carlo method, may follow. In one embodiment, the test evaluates the underwriting model in different scenarios based on the type of case the underwriter is processing. The evaluation method may be set by relevant indicators previously designed by the company. For example, the underwriting model may be tested for cases in which the applicant is soliciting a financial product/service for a life event such as term insurance (life, house, or car), a loan for a house, a loan a car, a loan for getting married, a loan for getting a divorce, a loan for having children, and any of the like.

Finally, after testing the underwriting model in all possible scenarios, the underwriting model may be institutionalized and embedded 416 into a set of decision tools within the underwriting platform or standard work. In some embodiments, this incorporation helps to validate and identify when an actual decision, within the underwriting process, varies significantly from heuristic. In other embodiments, this incorporation also sends an alert to the user before proceeding with that decision. Also, by incorporating the heuristic model into the decision toolset, the overall accuracy, speed and consistency of the underwriting process may significantly improve.

In some embodiments, a plurality of processes that are part of the method for improving the underwriting process are performed by one or more computing devices such as computing device 200. The methods are implemented with components of the exemplary operating environments of FIGS. 1-4. The steps of this exemplary method are embodied in a computer readable medium containing computer readable code such that the steps are implemented when the computer readable code is executed by a computing device. While the blocks in the disclosed processes are shown in a particular order, the actual order may differ. In some embodiments, some steps may be performed in parallel.

Figure 5:
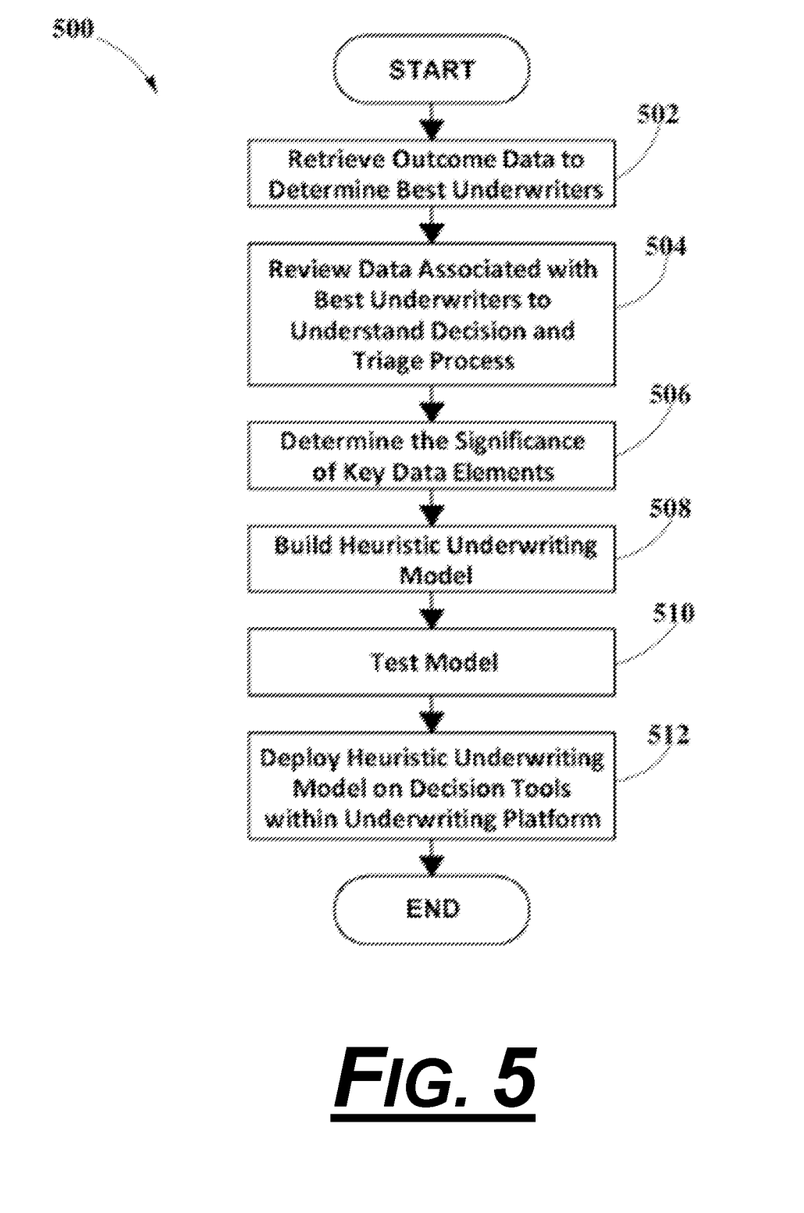
FIG. 5 is a flowchart of a method for improving the underwriting process, according to one embodiment.

FIG. 5 is a flowchart of a method for improving the underwriting process, according to one embodiment. In FIG. 5, method 500 operates within an underwriting platform that is configured to produce a heuristic underwriting model. The underwriting platform is further configured to deploy the underwriting model within a decision tool that junior or senior underwriters can use during the underwriting process of one or more applicants for any sort of financial/insurance product to improve their performance.

In one or more embodiments, method 500 begins with the process of retrieving outcome data to select and determine best underwriters (step 502). In some embodiment, the analytical engine works in parallel with the ranking module to fetch and select internal data from the internal database containing a pool of former and current underwriters profiles. In these embodiment, the profiles include information such as, for example, history of all cases worked by the agent/underwriter, decisions made throughout the underwriting process for different insurance products, goals achieved, time of the month, and work experience in general. In these embodiments, the analytical engine additionally fetches outcome data from external sources. Method 500 then advances to step 504.

At step 504, the analytical engine reviews internal data and outcome data to understand decision and triage processes. In some embodiments, internal data and outcome is data previously collected and sorted that includes identified key data elements. In these embodiments, key data elements are the decision heuristics made by the best underwriters, at most relevant points, when underwriting one or more applicants in one or more insurance products that resulted in successful cases. Method 500 then advances to step 506.

At step 506, the analytical engine determines the significance of the key data elements previously identified in step 504 by using one or more statistical tools. In some embodiments, the key data elements are developed by tracking the behavior of best underwriters to specific underwriting situations involving internal data and outcome data. Additional examples of key data elements include certificates of studies, recommendations, number of cases worked, and goals achieved among others.

Then, at step 508, the underwriting heuristics module builds a heuristic underwriting model based on the key data elements. In one embodiment, the underwriting model is coded by using any programming language and may provide the agent or underwriter with a suggested resolution based on the underwriting standards set by the company, potentially enhanced with third party data (e.g., outcome data), and the best practices derived from the top performing underwriters within the company. The resolution provided by the underwriting model can be a risk score calculation, a risk of loss assessment, or a risk classification, among others. In a further embodiment, the underwriting model emulates the resolution patterns of top performing underwriters by using statistical learning techniques such as support vector machine and logistic regression. These techniques can assume a linear or nonlinear relationship between factors and risk classes. In yet a further embodiment, the underwriting model also uses artificial intelligence tools such as expert systems and fuzzy logic. The company's underwriting standards and best underwriting practices may be updated periodically so that underwriting decision heuristic module continues improving the quality of its output over time. Method 500 then advances to step 510.

At step 510, the underwriting model is tested. In this embodiment, the underwriting model is tested under different scenarios based on the type of case the underwriter is processing. For example, the underwriting model is tested for cases is which the applicant is soliciting a financial product/service for a life event such as term insurance (life, house, or car), a loan for a house, a loan for a car, a loan for getting married, and the like. Method 500 then advances to step 512

At step 512, the previously built and tested underwriting model is deployed into a set of decision tools within the underwriting platform. In some embodiments, decision tools help to validate and identify when an actual decision, within the underwriting process, varies significantly from the heuristic decisions made by the best underwriters and sends an alert to the user before proceeding with that decision. In these embodiments, the alert tells the user what to do at any relevant point in the process. In other embodiments, the decision tools may train junior underwriters during the underwriting process. Also, by incorporating the heuristic underwriting model into the decision tools, the overall accuracy, speed and consistency of the underwriting process significantly improves.

By executing method 500 through the exemplary operating environments shown in FIGS. 1-4, big data analytics and data mining techniques can be implement for a more efficient and faster processing of larger data sets. In this way, efficiencies are created by providing the financial or insurance company with ways to improve the current underwriting process. In addition, the agents/underwriters can receive automatic suggestions or checklists with valuable information before making important decisions when underwriting an applicant for one or more insurance products. These features allow performing large work such as heavy calculations and time consuming analysis in a more efficient manner than other approaches such as manual work performed by humans.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
retrieving, by a server, outcome data associated with one or more applicant data by extracting one or more external databases comprising a social network database;
identifying, by the server, a subset of users from a set of former and current users each having a performance satisfying a threshold using a set of historic data obtained from an internal database and the outcome data retrieved from the one or more external databases;
generating, by the server, a hierarchical heuristic nodal network where each node within the hierarchical heuristic nodal network represents a decision made by each user within the subset of users;
generating, by the server, a heuristic artificial intelligence computer model utilizing a support vector machine algorithm based on the hierarchical heuristic nodal network, the heuristic artificial intelligence computer model being configured to emulate resolution patterns corresponding to processing of one or more previously-considered customers by each user within the subset of users;
generating, by the server, a decision tool user interface configured to implement the heuristic artificial intelligence computer model, wherein the decision tool user interface is configured to receive an input of information of a potential customer;
executing, by the server, the heuristic artificial intelligence computer model to generate a resolution corresponding to the potential customer, wherein the resolution comprises a risk score calculation, a risk of loss assessment, and a risk classification for the potential customer; and
when an inputted decision of a user interacting with the decision tool user interface differs from the resolution generated via the heuristic artificial intelligence computer model utilizing the support vector machine algorithm, displaying, by the server, an alert on the decision tool user interface before allowing the user to proceed with the decision.

2. The method according to claim 1, further comprising generating, by the server, a test protocol to determine a significance of each node within the hierarchical nodal network.

3. The method according to claim 1, wherein the heuristic artificial intelligence computer model is based at least in part on third party data.

4. The method according to claim 1, further comprising deriving, by the server, practices of the users within the subset of users.

5. The method according to claim 4, wherein the heuristic artificial intelligence computer model is based at least in part on the derived practices.

6. The method according to claim 2, wherein the test protocol is based upon a life event and a selected product or service.

7. The method according to claim 2, wherein the test protocol is based upon a life event.

8. The method according to claim 2, wherein the test protocol is based upon a selected product or service.

9. A system comprising:
an analytical engine server configured to:
retrieve outcome data associated with one or more applicant data by extracting one or more external databases comprising a social network database;
identify a subset of users from a set of former and current users each having a performance satisfying a threshold using a set of historic data obtained from an internal database and the outcome data retrieved from the one or more external databases;

generate a hierarchical nodal network where each node within the hierarchical nodal network represents a decision made by each user within the subset of users;

generate a heuristic artificial intelligence computer model utilizing a support vector machine algorithm based on the hierarchical nodal network, the heuristic artificial intelligence computer model being configured to emulate resolution patterns corresponding to processing of one or more previously-considered customers by each user within the subset of users;

generate a decision tool user interface configured to implement the heuristic artificial intelligence computer model, wherein the decision tool user interface is configured to receive an input of information of a potential customer; and execute the heuristic artificial intelligence computer model to generate a resolution corresponding to the potential customer, wherein the resolution comprises a risk score calculation, a risk of loss assessment, and a risk classification for the potential customer;

when an inputted decision of a user interacting with the decision tool user interface differs from the resolution generated via the heuristic artificial intelligence computer model utilizing the support vector machine algorithm, display an alert on the decision tool user interface before allowing the user to proceed with the decision.

10. The system according to claim 9, wherein the analytical engine server is further configured to: generate a test protocol to determine a significance of each node within the hierarchical nodal network.

11. The system according to claim 9, wherein the heuristic artificial intelligence computer model is based at least in part on third party data.

12. The system according to claim 9, wherein the analytical engine server is further configured to: derive practices of the users within the subset of users.

13. The system according to claim 12, wherein the heuristic computer model is based at least in part on the derived practices.

14. The system according to claim 10, wherein the test protocol is based upon a life event and a selected product or service.

\* \* \* \* \*